United States Patent [19]

Deichert et al.

[11] 4,153,641

[45] May 8, 1979

[54] POLYSILOXANE COMPOSITION AND CONTACT LENS

[75] Inventors: William G. Deichert, Macedon; Kai C. Su; Martin F. van Buren, both of Webster, all of N.Y.

[73] Assignee: Bausch & Lomb Incorporated, Rochester, N.Y.

[21] Appl. No.: 878,831

[22] Filed: Feb. 21, 1978

Related U.S. Application Data

[63] Continuation-in-part of Ser. No. 818,783, Jul. 25, 1977, abandoned.

[51] Int. Cl.$^2$ .................. C08L 43/04; C08L 83/00
[52] U.S. Cl. .................. 260/827; 260/448.2 Q; 260/448.2 B; 264/1; 264/2; 351/160 H; 526/279; 528/24; 528/26; 528/27; 528/32; 528/37; 528/42
[58] Field of Search .............. 351/160; 260/46.56 A, 260/448.2 Q, 448.2 B, 827, 46.5 Y, 46.5 H; 26/279; 264/1, 2; 528/24, 26, 27, 32, 37

[56] References Cited

U.S. PATENT DOCUMENTS

| | | | |
|---|---|---|---|
| 2,770,633 | 11/1956 | Sommer | 260/448.2 |
| 2,793,223 | 5/1957 | Merker | 260/448.2 |
| 2,865,885 | 12/1958 | de Benneville et al. | 260/46.5 |
| 2,906,735 | 9/1959 | Speier | 260/46.5 |
| 2,922,807 | 1/1960 | Merker | 260/448.2 |
| 3,228,741 | 1/1966 | Becker | 260/46.5 |
| 3,341,490 | 9/1967 | Burdick et al. | 260/37 |
| 3,518,324 | 6/1970 | Polmanteer | 260/825 |
| 3,763,081 | 10/1973 | Holub et al. | 260/37 SB |
| 3,808,178 | 4/1974 | Gaylord | 260/86.1 E |
| 3,878,263 | 4/1975 | Martin | 260/825 |
| 3,996,187 | 12/1976 | Travnicek | 260/37 SB |
| 3,996,189 | 12/1976 | Travnicek | 260/37 SB |

OTHER PUBLICATIONS

Katz et al., J. Polymer Sci., No. 46, pp. 139-148 (1974).
Katz et al., J. Polymer Sci., vol. 13, pp. 645-658 (1975).

*Primary Examiner*—Melvyn I. Marquis
*Attorney, Agent, or Firm*—Ronald L. Lyons; Frank C. Parker

[57] ABSTRACT

Monomeric polysiloxanes end-capped with activated unsaturated groups and polymers and copolymers thereof are disclosed herein for use as contact lenses with improved properties, such as, oxygen transportability, hydrolytic stability, biological inertness, transparency and improved strength without the use of fillers. The polymer composition comprises a poly(organosiloxane) α, ω terminally bonded through a divalent hydrocarbon group to a polymerized activated unsaturated group. Contact lenses made therefrom can be, as commonly referred to, "hard" or "soft". This hardness or softness is a function of the comonomer or the molecular weight of the monomers. Preferable the contact lenses are "soft".

The copolymer compositions of the instant invention comprise the polymerization product of the polysiloxane monomers and monomer or monomers containing an activated vinyl group. These polymers are employed to make optical products, e.g. contact lenses, intraocular implants, etc.

29 Claims, No Drawings

POLYSILOXANE COMPOSITION AND CONTACT LENS

CROSS-REFERENCE TO RELATED APPLICATIONS

This application is a continuation-in-part application of U.S. patent application Ser. No. 818,783 filed July 25, 1977 now abandoned.

BACKGROUND OF THE INVENTION

1. Field of the Invention

This invention relates to novel polymeric compositions and more particularly to contact lenses made therefrom. These contact lenses comprise fillerless, oxygen transportable, hydrolytically stable, biologically inert, transparent, contact lenses prepared from the polymerization of monomers which are poly(organosiloxanes) $\alpha,\omega$ terminally bonded through divalent hydrocarbon groups to activated unsaturated groups. The invention further particularly relates to polymers and/or copolymers which comprise poly(organosiloxanes) terminally bonded through divalent hydrocarbon groups to activated unsaturated groups copolymerized with monomers containing activated vinyl groups. The copolymers are optically clear, and colorless. The polymers and copolymers described herein can be usefully employed for, as stated, making "hard" or "soft" contact lenses, intraocular implants, as well as other prostheses, more particularly "soft" contact lenses.

PRIOR ART STATEMENT

The use of siloxane polymers for the fabrication of optical contact lenses is desirable. The desirability is due to the high oxygen transportability and generally the relative softness of polysiloxanes. The tear strength and tensile strength of polysiloxane elastomers, however, are generally poor and as a result fillers are employed to increase the strength of the elastomers. In U.S. Pat. Nos. 3,996,187, 3,996,189, 3,341,490 and 3,228,741 there are described contact lenses fabricated from poly(organosiloxanes) containing fillers. The tear strength and tensile strength of the contact lenses made from the instant polymer are of sufficient strength so that no fillers are required.

U.S. Pat. Nos. 3,996,187 and 3,996,189, as mentioned above, disclose contact lenses made from reinforced polysiloxanes. The lenses contain various polysiloxanes with index of refractions similar to the silica filler so that an optically clear silica filled silicone elastomer can be formed from aryl and alkyl siloxanes. The material contains from 5 to 20 percent silica. The silica is used, as mentioned, for strength. The instant invention contains no fillers for strength since the instant material has sufficient strength without fillers.

U.S. Pat. No. 3,341,490 discloses contact lenses made from blends of siloxane copolymers containing reinforcing silica fillers. As mentioned, the contact lenses of the instant invention contain no fillers.

U.S. Pat. No. 3,228,741 discloses contact lenses made from silicone rubber particularly hydrocarbon substituted polysiloxane rubber. This silicone material contains fillers such as pure silica to control flexibility, pliability and resiliency of the lenses. The instant polymers require no fillers.

U.S. Pat. No. 3,808,178 discloses a polymeric material containing a polymethacrylate backbone with relatively short poly (organosiloxane) ester side chains on the backbone polymer. There is no cross-linking involved in U.S. Pat. No. 3,808,178 since the monomers disclosed in U.S. Pat. No. 3,808,178 are monofunctional i.e. have only one functional group on each monomer. In order to get cross-linking in U.S. Pat. No. 3,808,178 it is taught at column 5 of U.S. Pat. No. 3,808,178 that different monomers must be added for cross-linking which have more than one functionality. However, in the instant invention cross-linking is obtained since each siloxane monomer is difunctional i.e. each monomer contains two functional groups, most preferably two methacrylate groups which results in cross-linking. Furthermore, contact lenses made from the polymers disclosed in U.S. Pat. No. 3,808,178 would not transport oxygen sufficiently whereas contact lenses made from the instant polymers would transport oxygen sufficiently to meet the requirements of the human cornea.

U.S. Pat. No. 3,518,324 teaches vulcanizing to make silicone rubber whereas the instant invention is concerned with contact lenses made from polymerizing specific monomers.

U.S. Pat. No. 3,878,263 teaches one configuration which may be

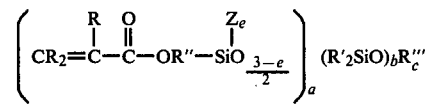

Rs may be monovalent hydrocarbons.
R' may be a monovalent hydrocarbon.
c may equal zero but when c equals zero then Z must be OR''''.

Z is an important ingredient since this is used to cross-link the chains. Therefore, the monomers of the instant invention are not taught in U.S. Pat. No. 3,878,263.

U.S. Pat. No. 2,770,633 discloses 1,3-bis(4-methacryloxybutyl) tetramethyl disiloxane, one of the preferred monomers used in the instant invention. This is taught at column 1, line 63 of U.S. Pat. No. 2,770,633 when R equals vinyl. However, U.S. Pat. No. 2,770,633 teaches only the monomer whereas the instant invention teaches not only the monomer but the polymer. In fact U.S. Pat. No. 3,770,633 would not want the monomer to polymerize since it would not perform its function as a lubricant if polymerized.

U.S. Pat. No. 2,906,735 teaches a reaction between an alkyl siloxane and acrylic acid or a methacrylic acid resulting in a disiloxane terminated by acrylate groups. U.S. Pat. No. 2,906,735 does not teach the polymers of the instant invention.

U.S. Pat. No. 2,922,807 discloses disiloxanes having acryloxy or methacryloxy groups attached to the silicone through a divalent alkylene radical of from 2 to 4 carbon atoms.

None of the above patents teach the instant invention much less the preferred reactions of the instant invention which is 1,3-bis(4-methacryloxybutyl) tetramethyl disiloxane reacted with preferably octamethyl cyclotetrasiloxane to form the preferred monomer. This preferred monomer is then polymerized to the preferred cross-linked polymer of the instant invention. Furthermore, and most importantly, none of the prior art teaches novel contact lenses of the instant invention made from the instant polymers.

U.S. Pat. No. 3,763,081 discloses, in pertinent part, the polymerization of an unsaturated siloxane which is somewhat difficult to polymerize since a double bond in this type of monomer generally is not very active. One must use both high temperatures and a peroxide catalysis or a platinum catalysis in order to complete this type of reaction. See, for example, U.S. Pat. No. 3,763,081 at column 4 lines 55–46. In the instant reaction the monomeric materials are referred to specifically as having activated unsaturated groups bonded through a divalent hydrocarbon group to the siloxane whereas U.S. Pat. No. 3,763,081 has no activated unsaturated groups bonded to the siloxane.

U.S. Pat. No. 2,865,885 in pertinent part teaches a vinyl group which is not activated as shown in column 1 lines 25–30 of U.S. Pat. No. 2,865,885. The reason U.S. Pat. No. 2,865,885's double bond is not "active" in the sense as defined in the instant application is that the double bond is bonded to either sulfur or oxygen. In the instant invention this same position would have a

carbonyl group. This would make the double bond active as defined in the instant application. Therefore, in U.S. Pat. No. 2,865,885 since the reactivity ratios are so different i.e. the double bond is not active in U.S. Pat. No. 2,865,885 as defined in the instant invention, it would be very difficult to get an acceptable copolymerization reaction using the formulae of U.S. Pat. No. 2,865,885 as compared to the active double bond in the instant invention which easily copolymerizes. In the instant invention the vinyl group is "activated" to facilitate free radical polymerization. The formula given at column 1, lines 25–30 of U.S. Pat. No. 2,865,885 does not lend itself to free radical polymerization due to the lack of resonance but rather it lends itself to ionic polymerization due to the polar nature of the substituents. Therefore, it would be extremely difficult, if at all possible, for U.S. Pat. No. 2,865,885 to form the compounds of the instant invention. Also the compounds formed in U.S. Pat. No. 2,865,885 are not hydrolytically stable because of the presence of the siliconenitrogen bond in the formula. The instant invention cannot use a hydrolytically unstable compound. Furthermore, the products of this hydrolysis in U.S. Pat. No. 2,865,885 could be injurious to the human eye particularly the amines. Also at column 3 of U.S. Pat. No. 2,865,885 the linkage is an amine linkage to the double bond and in the instant invention this linkage is always an alkyl. Therefore, U.S Pat. No. 2,865,885 does not teach the instant monomers.

U.S. Pat. No. 2,793,223 in pertinent part at Example 5 at column 3, lines 30–41 teaches that a phenyl group is attached to the siloxane. Therefore, that material would be very hard and opaque. This would be unsuitable for contact lens which must be transparent. Furthermore, contact lenses made from the polymers made from the monomers disclosed in U.S. Pat. No. 2,793,223, because of the presence of the phenyl group on the siloxane as shown in Example 5 of U.S. Pat. No. 2,793,223, would not transport oxygen sufficiently whereas contact lenses made from the instant polymers would transport oxygen sufficiently to meet the requirements of the human cornea.

SUMMARY OF THE INVENTION

The present invention provides materials which can be usefully employed for the fabrication of prostheses such as heart valves and intraocular lenses, as optical contact lenses or as films. More particularly, the instant invention concerns contact lenses.

In one embodiment of this invention is provided fillerless, oxygen transporting, hydrolytically stable, biologically inert, transparent contact lenses comprising a cross-linked polymer made from a poly(organosiloxane) $\alpha,\omega$ terminally bonded through a divalent hydrocarbon group to a polymerized activated unsaturated group.

When the term "activated" is used with the term "unsaturated group" herein, it is meant that an unsaturated group which is activated is one which has a substituent which facilitates free radical polymerization. These activated unsaturated groups are polymerized to form the polymers of the instant invention. Preferably, the activating groups used herein lend themselves to polymerization under mild conditions, such as, ambient temperatures.

When the statement is made "a poly(diorganosiloxane) terminally bonded through a divalent hydrocarbon group to a polymerized activated unsaturated group" it is meant that the poly(organosiloxane) compound as described herein has been attached to a compound having a divalent hydrocarbon group, such as, methylene or propylene etc. and then at each end of this compound is attached an activated unsaturated group such as methacryloxy etc. and this then is the most preferred monomer. Then when the monomers are polymerized (i.e. cross-linked) the activated unsaturated groups are polymerizated (free radical polymerization) then the monomers form three dimensional polymers which is the material of which the contact lens are made.

The monomers employed in accordance with this invention, as a result of the presence of the activated unsaturated groups, are readily polymerized to form three dimensional polymeric networks which permit the transport of oxygen and are optically clear, strong and can be made, as desired, soft or hard.

When the term monomer is used herein we mean to include polysiloxanes end-capped with polymerizable unsaturated groups. The process of lengthening the siloxane portion of the monomer is referred to herein as siloxane ring insertion. The chain length of the polysiloxane center unit of the monomers may be as high as 800 or more.

When the term polymerization is used herein we refer to the polymerization of the double bonds of the polysiloxanes endcapped with polymerizable unsaturated groups which results in a cross-linked three dimensional polymeric network.

The relative hardness (or softness) of the contact lenses, i.e. polymer, of this invention can be varied by decreasing or increasing the molecular weight of the monomeric poly(organosiloxane) end-capped with the activated unsatured groups or by varying the percent of the comonomer. As the ratio of organosiloxane units to end cap units increases the softness of the material increases. Conversely, as this ratio decreases the rigidity and hardness of the material increases.

More preferably there is provided a fillerless, oxygen transporting, flexible, hydrolytically stable, biologically inert, transparent, resilient, soft, polymeric contact lens comprising a poly(organosiloxane) terminally bonded through a divalent hydrocarbon group to a polymerized activated unsaturated group. This preferred contact lens may be formed by spin-casting, if desired, such as taught in U.S. Pat. No. 3,408,429.

In another embodiment of this invention there are provided polymerizates comprising a poly(organosiloxane) α,ω terminally bonded through a divalent hydrocarbon group to an activated unsaturated group copolymerized with one or more monomers which can be one of lower esters of acrylic or methacrylic acid, styryls, allyls or vinyls. The copolymers are in the form of three dimensional networks which are clear, strong and can be usefully employed in providing films, and shaped bodies such as contact lenses.

The novel copolymers of this invention can comprise 10 to 90 parts by weight of one or more of the monomers of (organosiloxanes) described herein and 90 to 10 parts by weight of the polymerizable monomers. The preferred contact lenses formed from these copolymers are fillerless, oxygen transporting, flexible, hydrolytically stable, biologically inert, transparent, resilient and soft.

The three-dimensional network polymer products of this invention are readily prepared by means of conventional free radical polymerization techniques. The monomers of organosiloxane alone or in the presence of comonomers together with about 0.05 to about 2% by weight of a free radical initiator may be heated to a temperature of about 30° C. to about 100° C. to initiate and complete the polymerization. The polymerizable monomers i.e., the poly(organosiloxane), with or without comonomers can preferably be subjected at room temperature to irradiation by UV light in the presence of suitable activators such as benzoin, acetophenone, benzophenone and the like for a sufficient time so as to form a three dimensional polymer network.

The polymerization can be carried out directly in contact lens molds or can be cast into discs, rods or sheets which can then be fabricated to a desired shape. Preferably the polymerization is carried out while the material is being spin cast such as taught in U.S. Pat. No. 3,408,429.

As is well established, the oxygen transportability of polysiloxanes is substantially greater in comparison to the conventional contact lens polymers such as polymethyl methacrylate (PMMA) or polyhydroxyethylmethacrylate (PHEMA). The oxygen transportability of the materials of this invention can be varied by altering the percentage of siloxane units. For example, a high percentage of siloxane units results in a produce more capable of transporting oxygen as compared with a lower percentage of siloxane units which results in a material with less ability to transport oxygen.

DESCRIPTION OF PREFERRED EMBODIMENTS

In accordance with one embodiment of this invention optical contact lenses are provided which are fabricated from three-dimensional network polymerizates of poly(organosiloxanes) α,ω terminally bonded through a divalent hydrocarbon group to a polymerized activated unsaturated group. Typically, the poly(organosiloxanes) i.e. monomers, employed are of the formula:

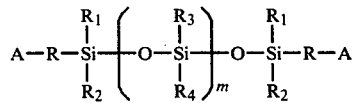

wherein A is an activated unsaturated group, R is a divalent hydrocarbon radical having from 1 to about 22 carbon atoms, $R_1$, $R_2$, $R_3$ and $R_4$ can be the same or different and each is one of a monovalent hydrocarbon radical or a halogen substituted monovalent hydrocarbon radical each having from 1 to about 12 carbon atoms and m is 0 or greater.

Desirably m can be in the range of 50 to about 200. However, the range of m can be greater such as preferably 50 to 800. However, m can be greater than 800. Should one desire to obtain a harder contact lens m should be less than 25.

When the term "soft" is used herein to describe the contact lenses of the instant invention it is meant that m, in the above formula, after polymerization, is more than 25, preferably from about 50 about 800. When the term "hard" is used herein to describe the contact lenses of the instant invention, it is meant that m, in the above formula, after polymerization, is less than 25.

Preferably A is one of

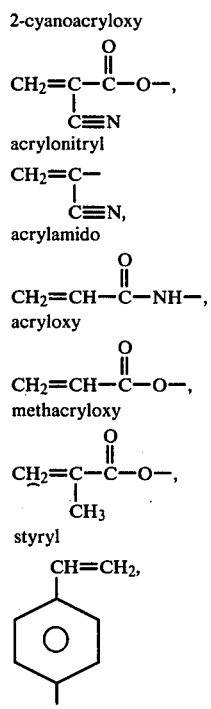

and

N—vinyl—2—pyrrolidinone—X—yl wherein x may be 3, 4 or 5

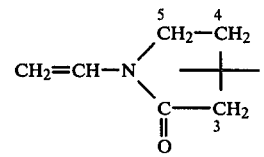

More preferably A is acryloxy or methacryloxy. However, other groups containing activated unsaturation can be readily employed, such groups being well known to those skilled in the art. Most preferably A is methacryloxy or acrylamido. R may be preferably an alkylene radical. Therefore, preferably R is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferable R is an alkylene radical having about 1, 3 or 4 carbon atoms. Most preferably R is an alkylene radical having from about 3 to 4 carbon atoms e.g. butylene. Preferably, $R_1$, $R_2$, $R_3$ and $R_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., phenyl, naphthyl and the like; aralkyl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as floromethyl and floropropyl. More preferably $R_1$, $R_2$, $R_3$ and $R_4$ are methyl radicals and phenyl radicals, most preferably $R_1$, $R_2$, $R_3$ and $R_4$ are methyl radicals.

The activated unsaturated group end-capped polysiloxanes, i.e. monomers, employed in this invention can be prepared by equilibrating the appropriately substituted disiloxane, for example, 1,3-bis(4-methacryloxybutyl) tetramethyl disiloxane, with a suitable amount of a cyclic diorganosiloxane, e.g., hexamethyl cyclotrisiloxane, octaphenyl cyclotetrasiloxane, hexaphenylcyclotrisiloxane, 1,2,3-trimethyl- 1,2,3-triphenylcyclotrisiloxane, 1,2,3,4-tetramethyl- 1,2,3,4-tetraphenyl cyclotetrasiloxane and the like in the presence of an acid or base catalyst. The degree of softness, the physical properties such as tensile strength, modulus and percent elongation will determine the amount of cyclic diorganosiloxane equilibrated with the disiloxane. By increasing the amount of cyclic siloxane one increases m.

The reaction between a cyclic diorganosiloxane and disiloxanes, although not specifically disclosed for the disiloxanes employed in this invention as to provide the activated unsaturated groups as the end caps for polysiloxanes, is a conventional reaction and described by, for example, Kojima et al. Preparation of Polysiloxanes Having Terminal Carboxyl or Hydroxyl Groups, J. Poly. Sci., Part A-1, Vol. 4, pp 2325-27 (1966) or U.S. Pat. No. 3,878,263 of Martin issued Apr. 15, 1975, incorporated herein by reference.

The following reactions represent the most preferred materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

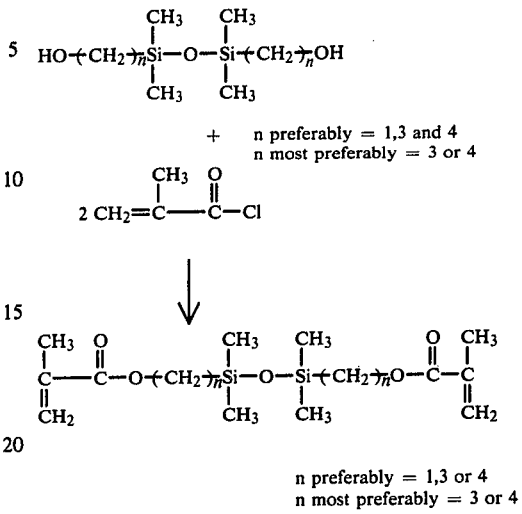

(2) Another most preferred method of preparing 1,3-bis(hydroxyalkyl) tetramethyl disiloxane dimethacrylates is by transesterification with methyl methacrylate:

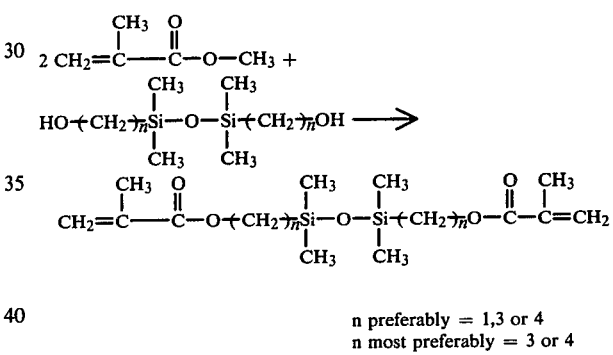

Then the number of siloxane groups between the two methacrylate caps can be increased from 2 to 2+4X by a ring opening insertion reaction with X moles of octamethyl cyclotetrasiloxane as follows:

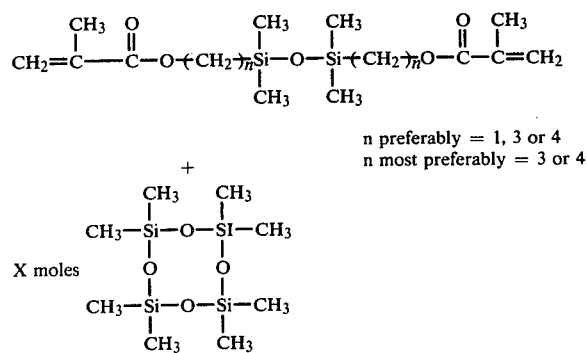

-continued

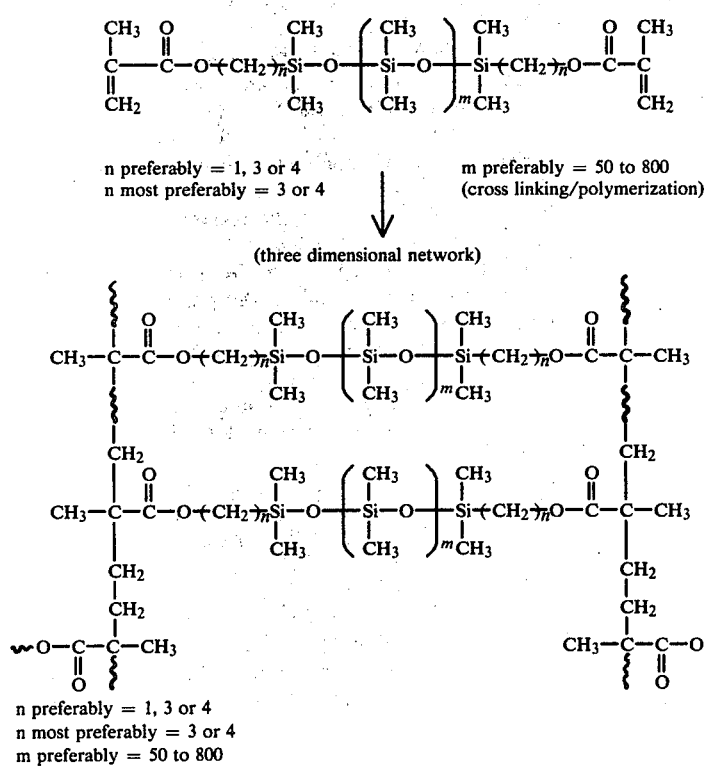

n preferably = 1, 3 or 4
n most preferably = 3 or 4
m preferably = 50 to 800

The poly(organosiloxanes) α,ω terminally bonded through a divalent hydrocarbon group to an activated unsaturated group i.e. the monomers herein, are generally clear, colorless liquids whose viscosity depends on the value of m. These monomers can be readily cured to cast shapes by conventional methods such as UV polymerization, or through the use of free radical initiators plus heat. Illustrative of free radical initiators which can be employed are bis(ispropyl) peroxy dicarbonate, azobisisobutyronitrile, acetyl peroxide, lauroyl peroxide, decanoyl peroxide, benzoyl peroxide, tertiarybutyl peroxypivalate and the like.

In order to further control the properties of the polymers of the instant invention one can polymerize a mixture of the monomers comprising monomers having a low value of m and monomers having a high value for m. When m has a low value i.e., below 25, the resulting contact lenses i.e. polymers, are relatively hard, oxygen transporting, hydrolytically stable, biologically inert, transparent and do not need fillers to improve the mechanical properties. The monomers have a relatively low molecular weight and as a result the viscosity is low enough e.g. about 3 centistokes so that the lenses may be made easily by spin casting. When m has a relatively high value i.e., above 25, the resulting contact lenses i.e. polymers, become relatively soft, oxygen transporting, flexible, hydrolytically stable, biologically inert, transparent, resilient, and do not need fillers to improve the mechanical properties. The monomers should have preferably a molecular weight low enough so that the viscosity is low enough to spin cast the monomers e.g. about 175 stokes or below measured in Gardner viscosity tubes. Preferably m is about 50 to 800.

In accordance with another embodiment of this invention there are provided polymers of monomers which are poly(organosiloxane) terminally bonded through a divalent hydrocarbon group to an activated unsaturated group copolymerized with monomers containing an activated vinyl group.

The comonomer can be any polymerizable monomer which readily polymerizes by free radical polymerization and preferably is a monomer containing an activated vinyl group. Through the addition of comonomers one can enhance particular desirable properties. For example, buttons fabricated from copolymers of the instant monomers of the poly(siloxanes) and tetrahydrofurfuryl methacrylate can be more easily lathed into contact lenses as compared with buttons i.e. polymers, made from monomeric polysiloxanes alone. Wettability of contact lenses i.e. polymers, fabricated from the polysiloxanes can be substantially increased by copolymerizing the instant monomers with N-vinyl pyrrolidone.

Illustrative of comonomers which can be usefully employed in accordance with this invention are:

The derivatives of methacrylic acid, acrylic acid, itaconic acid and crotonic acid such as:

methyl, ethyl, propyl, isopropyl, n-butyl, hexyl, heptyl, aryl, allyl, cyclohexyl, 2-hydroxyethyl, 2 or 3-hydroxypropyl, butoxyethyl, methacrylates; and propyl, isopropyl, butyl, hexyl, 2-ethyl hexyl, heptyl, aryl, acrylates; and propyl, isopropyl, butyl, hexyl, 2-ethyl hexyl, heptyl, aryl, itaconates; and propyl, isopropyl, butyl, hexyl, 2-ethyl hexyl, heptyl, aryl, crotonates.

Mono or di esters of the above mentioned acids with polyethers of the below general formula may be used:

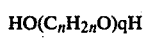

wherein n is a number of from 1 to about 12, preferably 2 or 3, and q is a number of from 2 to about 6 preferably 2 to 3.

Other comonomers may include:

styryls, such as, styrene, divinyl benzene, vinyl ethyl benzene, vinyl toluene etc.

Allylic monomers, such as, di allyl diglycol dicarbonate, allylcyanide, allyl chloride, diallyl phthalate, allyl bromide, diallyl fumarate and diallyl carbonate may be used.

Nitrogen containing monomers can be also used, such as:

n-vinyl pyrrolidone, 3-oxybutyl acryamide, etc.

The lower the value of m in the formula for the instant monomers the more compatible are the monomers with the above mentioned comonomers.

The advantages of using the contact lenses i.e. polymers, of the instant invention which are made from the monomers disclosed herein are numerous. For example, (1) the advantages of using activated vinyl terminal groups to cure the siloxane material are (a) the high reactivity systems permit rapid cure at room temperature if suitable initiators are used. Room temperatures are preferred. This is desirable since the preferred method of casting is spin casting. (b) No fillers are needed to get useful physical strength as is common with most silicone resins. This is desirable since the use of fillers requires that other possibly undesirable materials be added to the composition in order to correct the refractive index. (2) Furthermore, the contact lenses made from the polymer of the instant invention are oxygen transporting. The human cornea requires about $2 \times 10^{-6}$ cm$^3$/(sec. cm$^2$ atm.) of oxygen through the contact lens as reported by Hill and Fatt, American Journal of Optometry and Archives of the American Academy of Optometry, Vol. 47, p. 50, 1970. When m is at least about 4 the chain of siloxane is long enough in the instant composition to exceed the oxygen transportability requirements of the cornea. However, in specific situations m may be as low as 0. Because of the unique properties of the contact lenses i.e. polymers, of the instant invention m may be great enough to allow sufficient oxygen transportability and at the same time still retain its desirable properties of elasticity, tear resistance, flexibility, resilience and softness.

When the term oxygen transportability or oxygen transporting is used in the instant application it is meant that the material will allow sufficient transmission of oxygen through itself to supply the necessary oxygen requirements of the human cornea. The oxygen requirement for the human cornea as mentioned, is about $2 \times 10^{-6}$ cm$^3$/(sec. cm$^2$ atm.). The oxygen transportability was determined by a special test procedure described in conjunction with Example 10 herein. (3) These lenses are hydrolytically stable meaning that when the contact lenses are placed into an aqueous solution, e.g., in the eye, or during the disinfecting step, i.e. water plus heat, the lenses will not change in chemical composition, i.e. hydrolyze, which would cause the lenses to change shape resulting in an undesirable change in optics. (4) The more preferred contact lenses of the instant invention are also resilient. When the term resilient is used herein it is meant that after the lenses have been deformed the lenses will return quickly to their original shape. (5) The lenses are preferably made by spin casting, e.g. by the method as disclosed in U.S. Pat. No. 3,408,429. Monomers which have too high a viscosity cannot be spin cast. However, generally the higher the molecular weight of the monomers the longer the chain length, i.e. the larger the value of m, and as a consequence the more desirable the properties are for the preferred contact lenses i.e. polymers, of the instant invention, made from these monomers. The longer the chain length and the higher the molecular weight the higher the viscosity of the monomers. However, if spin casting is to be used the viscosity of the monomers must be such that these materials can be spin cast. The monomers of the instant invention can have molecular weights high enough to give all the desirable properties when polymerized but low enough to be spin cast while still in the monomeric form. The preferred weight average molecular weight is from about 4,000 to 60,000 for the monomers of the instant invention. (6) The most preferred contact lenses of the instant invention should be soft. By the use of the term "soft" in the instant application it is meant in the preferred embodiment that the lenses should have a Shore hardness of about 60 or below on the A scale (7) The preferred contact lenses of the instant invention should be flexible. When the term "flexible" is used herein, it is meant that the contact lens is capable of being folded or bent back upon itself without breaking.

The most preferred contact lens of the instant invention is a fillerless, oxygen transporting, flexible, hydrolytically stable, biologically inert, transparent, resilient, soft, polymeric contact lens comprising a poly(organosiloxane) terminally bonded through a divalent hydrocarbon group to a polymerized activated unsaturated group. The poly(organosiloxane) monomer used to make the polymer from which the contact lens is made has the formula in the most preferred embodiment of the instant invention of

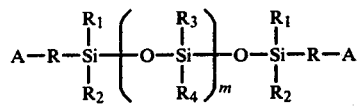

wherein A is selected from the group consisting of methacryloxy and acryloxy, R is an alkylene radical having from about 3 to about 4 carbon atoms and m is from about 50 to 800.

The most preferred contact lenses i.e. polymers, of the instant invention, as mentioned, are fillerless, have an oxygen transport rate of at least about $2 \times 10^{-6}$ cm$^3$/(sec. cm$^2$ atm.), are hydrolytically stable, biologically inert, transparent, resilient, and have a softness preferably of about 60 or below on the Shore hardness A scale. Most preferably the Shore hardness should be 25 to 35 on the A scale.

To further illustrate the most preferred contact lenses of the instant invention's physical properties, the tensile modulus of elasticity should be about 400 g/mm/mm$^2$ or less. Both the Shore hardness and modulus are related to the comfort of the lenses to the wearer when used on the human eye.

Another advantage of the preferred soft contact lenses of the instant invention is that lenses made from the polymers of the instant invention can be made large enough to cover the entire cornea of the eye resulting in more comfort. Hard contact lenses, such as PMMA lens, have to be made smaller due to their poor oxygen transportability. Furthermore, the larger the lenses, the easier it is to locate the optical center of the lenses. The larger the lens the easier it is to maintain the optical axis which is required in making special lenses for people with particular eye problems, e.g., for those persons with astigmatism. Another advantage of the preferred soft lenses of the instant invention is that the instant preferred soft lenses have a softness similar to HEMA lenses but in addition, and most importantly, are more oxygen permeable, i.e. are capable of transporting more oxygen. HEMA lenses are not oxygen permeable or capable of transporting oxygen to a degree necessary to meet all the requirements of the human cornea.

The following examples are illustrative only and should not be construed as limiting the invention. All parts and percents referred to herein are on a weight basis and all viscosities measured at 25° C. unless otherwise specified.

EXAMPLE 1

557 g of 1,3-bis(4-hydroxybutyl)tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added drop wise. The mixture is agitated continuously overnight. The reaction solution is extracted consecutively with 10% water solutions of HCl and NH₃ in order to remove excess reagents and pyridine hydrochloride. The resulting solution of the product in hexane is dried with anhydrous MgSO₄, filtered, and solvent removed at reduced pressure. About 459 g (55% yield) of 1,3-bis(4-methacryloxy butyl)tetramethyl disiloxane is collected. The structure is confirmed by infrared spectra, proton magnetic resonance spectra and elemental analysis. IR spectra shows no intense hydroxyl band between 3100 and 3600 cm$^{-1}$ but does show strong methacrylate absorptions at 1640 and 1720 cm$^{-1}$. PMR spectra agreed with the proposed structure:

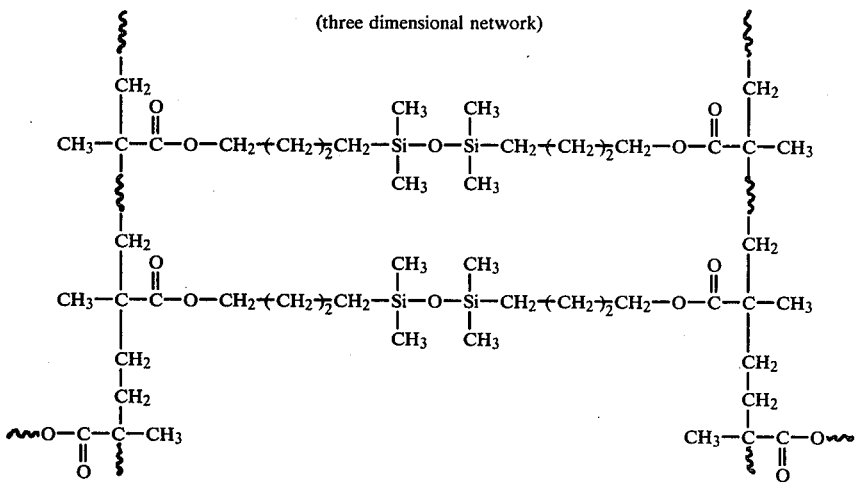

1,3-bis(4-methacryloxy butyl) tetramethyl disiloxane.

| Proton | ppm | Integrated Area | Multiplicity |
|---|---|---|---|
| H$^1$ | 7.0$_5$ | 1 | singlet |
| H$^2$ | 6.5$_0$ | 1 | singlet |
| H$^3$ | 3.0$_0$ | 3 | singlet |
| H$^4$ | 5.1$_5$ | 2 | triplet |
| H$^5$ | 2.7 | 4 | multiplet |
| H$^6$ | 1.6$_5$ | 2 | triplet |
| H$^7$ | 1.2$_0$ | 6 | singlet |

Elemental analysis gave 13.6% Si (calc. 13.5%), 58.1% C (calc. 57.9%, and 9.4% H (calc. 9.2%). The product was a clear, colorless, fragrant fluid.

EXAMPLE 2

The fluid product of Example 1 is placed between glass plates with 0.2% benzoin methyl ether and irradiated with UV light at room temperature. A colorless, optically clear, hard, highly crosslink film is obtained. The following is a representation of the cross-linked polymer.

EXAMPLE 3

489.75 g of octamethylcyclotetrasiloxane and 10.25 g of 1,3-bis(4-methacryloxybutyl)tetramethyl disiloxane are charged into a reaction vessel equipped with a mechanical stirrer. About 25 g of Fuller's Earth and 1.35 ml of conc. H₂SO₄ are mixed and added to the vessel with continuous stirring while bubbling dry N₂ through the reaction mixture. The charge is warmed to 60° C. and stirred for two days, at which time the viscous fluid is neutralized with Na₂CO₃, diluted with hexanes, and filtered. The hexanes/monomer solution is washed with water, dried with MgSO₄ (anhydrous) and solvent removed at reduced pressure. Low molecular weight unreacted cyclic siloxanes are removed by heating the monomer to 110° C. at 0.2 mm Hg in a rotary evaporator. The product obtained is an odorless, colorless, clear fluid of 8.5 stokes viscosity measured in Gardner Viscosity tubes. The monomer comprised about 260 repeating

units. Fluid collected during the devolatilizing of the product shows no methacrylate absorptions in IR spectra and could not be cured.

IR spectra of the monomer shows a slight methacrylate absorption and broad siloxane absorptions between 1000 and 1100 cm$^{-1}$, indicative of linear poly(dimethyl siloxanes) with the following formula:

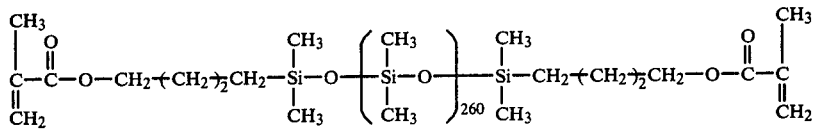

EXAMPLE 4

Films of the fluid product of Example 3 are cast between glass plates by adding 0.2% bis(isobutyl)peroxy dicarbonate to the monomer and heating for ½ hour at 40° C., ½ and 60° C. and 174 hr. at 80° C. The glass plates are separated. The films are then kept at 80° C. for 15 minutes. Colorless optically clear, odorless, elastic and strong films are obtained such as represented by the three dimensional network polymer below. The following physical properties are measured on an Instron tester ASTM D1708, no conditioning, using standard "dog bone" samples cut from 0.2 mm thick films. The speed is 0.25 inches per minute. This test is used on all the Examples where tensile strength, modulus and elongation are measured.

EXAMPLE 6

About 97.3 g of octamethyl cyclotetrasiloxane, 2.7 g of 1,3-bis(4-mehacryloxybutyl)tetramethyl disiloxane and 0.6 ml of trifluoromethyl sulfonic acid are charged to a pressure bottle, sealed and shaken for 24 hours. The viscous manner fluid obtained is neutralized with sodium carbonate and diluted with hexanes. The monomer/hexanes solution is washed with water, dried with anhydrous $MgSO_4$ and the solvent removed at reduced pressure. Volatiles are removed from the monomer at 0.2 mm Hg and 110° C. using a wiped film still. High pressure gel permeation chromatography of the product shows essentially total removal of low molecular weight volatile material. The product is a colorless, clear, odorless fluid of 4.4 stokes viscosity measuring in Gardner viscosity tubes. The polymer below comprises about 200 repeating

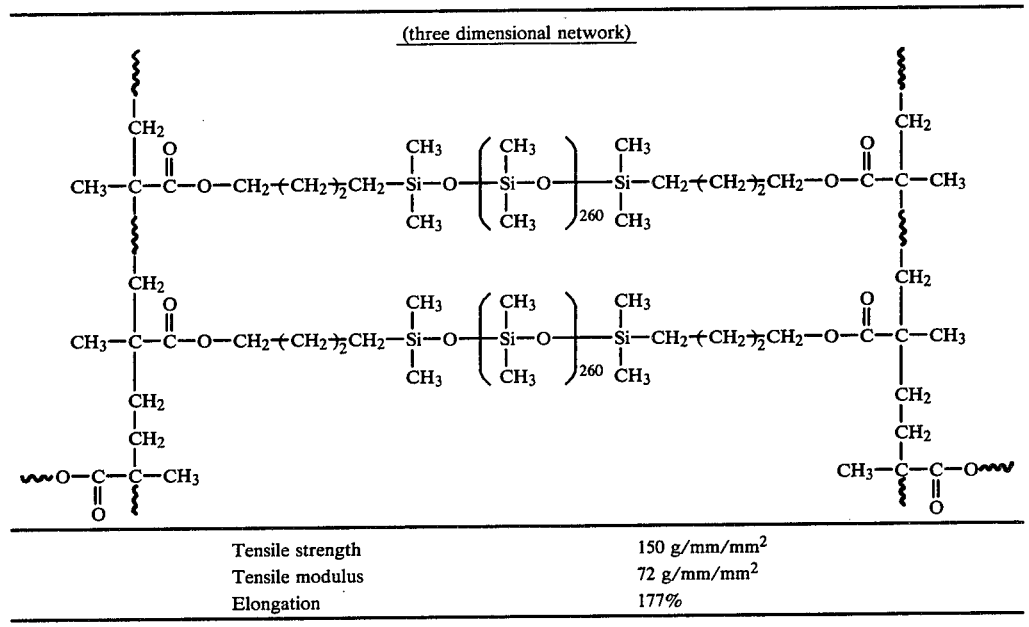

| Tensile strength | 150 g/mm/mm² |
| Tensile modulus | 72 g/mm/mm² |
| Elongation | 177% |

EXAMPLE 5

The fluid product of Example 3 together with 0.2% di(sec-butyl)-peroxydicarbonate is placed in a suitable contact lens spin casting mold and spin cast under polymerizable conditions to a contact lens such as taught in U.S. Pat. No. 3,408,429. The lens is optically clear, elastic and strong.

units. IR spectra are similar to those taken in Example 3.

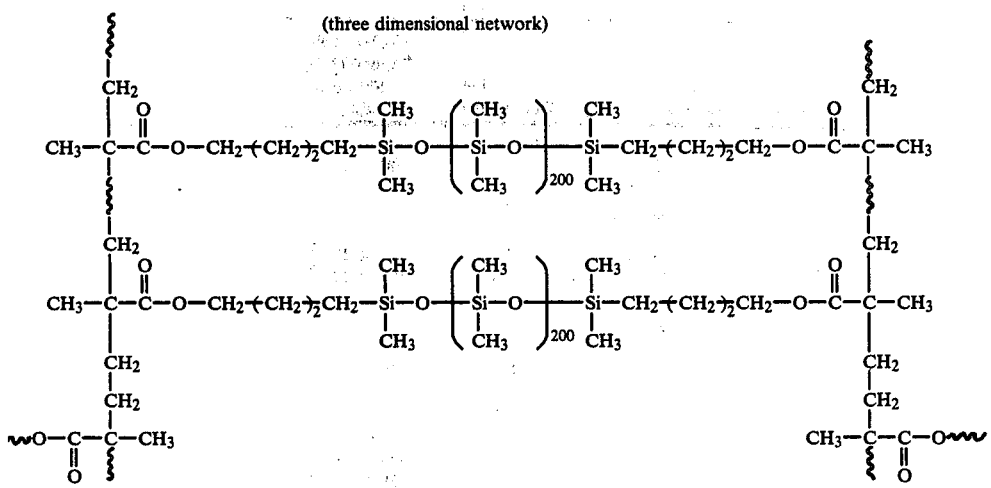
(three dimensional network)

EXAMPLE 7

Films are made from the viscous fluid product of Example 6 using procedures similar to Example 4. The films are tested, ASTM D1708, obtaining the following results:

| Tensile strength | 159 g/mm/mm² |
| --- | --- |
| Tensile modulus | 104 g/mm/mm² |
| Elongation | 151% |

EXAMPLE 8

The viscous fluid product produced in Example 6 is mixed with 2.0% benzoin butyl ether. About 30 μl of the mixture is placed in a spinning contact lens mold under N₂ atmosphere. After 20 minutes irradiation with UV light, a cured contact lens is obtained. The lens formed is optically clear, elastic and strong.

EXAMPLE 9

Ten (10) parts of allylmethacrylate monomer and four tenths (0.4) of a part of t-butyl peroctoate are added to ninety (90) parts of the fluid product obtained in Example 4. The reaction mixture is placed into a casting cell which is then placed into an 80° C. over for half an hour. The temperature is thereafter raised to 100° C. and maintained at 100° C. for one hour. An optically clear film is removed from the cell and kept at 80° C. for 15 minutes.

The above is repeated by reacting the product of Example 4 with several other monomers as shown in Table 1. The percent shown in Table I is the percent of co-monomer used. The properties of the copolymers are outlined in Table I.

As illustrated in Table, I, it is one purpose of the instant invention to increase the tensile strength and elongation while retaining sufficient oxygen transportability. One problem with the prior art silicone polymers is that these polymers are not very strong and have poor tear strength and poor tensile strength. One of the problems with the PHEMA (control) is that contact lenses made from this material do not have the necessary oxygen transporting properties to meet all the requirements of the human cornea. As mentioned, the oxygen requirement of the human cornea is about $2 \times 10^{-6}$ cm³/(sec. cm² atm). Table I illustrates the effect the instant co-monomers have on the strength of the polymers of the instant invention. There is an improvement in tensile strength with the use of the instant monomers.

In the case of modulus, it would be most preferred if the modulus is below 300 in order to obtain a soft contact lens. Therefore, generally the lower the modulus the softer the contact lens.

As to elongation, it is generally preferred that elongation be as high as possible.

As to oxygen transport, it is desirable that this rate be maximized. This rate should be greater than the rate of oxygen required by the human cornea.

The tensile strength test, modulus test and elongation test are measured, as mentioned, on an Instron Tester ASTM D 1708 using standard "dog bone" samples cut from 0.2 mm thick films. There is no conditioning and the speed is 0.25 inches per minute.

The Oxygen Transport Rate was determined by the following technique. This test is measuring the oxygen permeability of a material while it is wet with water. This is an attempt to closely reproduce the same conditions which exist in the human eye when fitted with a contact lens. Two chambers filled with water at 32° C. are connected together by a common passageway over which is placed the material to be tested. Nitrogen-purged water is pumped into both chambers until the oxygen concentration is very low (~0.04 ppm). Then air water (oxygen concentration ~8 ppm) is introduced into the lower chamber. There is located in the upper chamber an oxygen sensing electrode which measures the diffusion of oxygen from the lower chamber through the membrane being tested and into the upper chamber. This measures apparent oxygen transport rate of the material covering the passageway between the two chambers.

TABLE I

| | | Tensile Strength (g/mm/mm²) | Modulus (g/mm/mm²) | Elongation (Percentage) | Approximate *Apparent O₂ Transport Rate |
| --- | --- | --- | --- | --- | --- |
| PHEMA | | 40 | 40 | 150 | $4 \times 10^{-7}$ |
| Allyl methacrylate | 10% | 71 | 143 | 65 | $62 \times 10^{-7}$ |

TABLE I-continued

| | | Tensile Strength (g/mm/mm²) | Modulus (g/mm/mm²) | Elongation (Percentage) | Approximate *Apparent O₂ Transport Rate |
|---|---|---|---|---|---|
| Butoxyethyl methacrylate | 10% | 26 | 42 | 100 | $50 \times 10^{-7}$ |
| Butoxyethyl methacrylate | 30% | 31 | 38 | 136 | |
| Cyclohexyl methacrylate | 10% | 70 | 75 | 131 | $56 \times 10^{-7}$ |
| Ethyl methacrylate | 10% | 67 | 80 | 136 | $54 \times 10^{-7}$ |
| Methyl methacrylate | 10% | 100 | 90 | 145 | |
| Ethyl hexyl acrylate | 10% | 50 | 73 | 110 | $54 \times 10^{-7}$ |
| Ethyl hexyl acrylate | 30% | 41 | 69 | 105 | |
| n bu acrylate | 10% | 49 | 79 | 110 | |
| n bu acrylate | 30% | 30 | 79 | 58 | $50 \times 10^{-7}$ |
| bu acrylate | 10% | 51 | 78 | 116 | $58 \times 10^{-7}$ |
| bu acrylate | 30% | 37 | 80 | 82 | |

*Apparent Oxygen Transport Rate = $\dfrac{cm^3(O_2)}{sec\text{-}cm^2\text{-}atm}$

EXAMPLE 10

58.3 g of 1,3-bis(4-methacryloxybutyl)tetramethyl disiloxane, 41.7 g of octamethyl cyclotetrasiloxane, 1 ml concentrated H₂SO₄ and 2 gm of Fuller's earth are charged into a pressure flask. After two days equilibration the mixture is neutralized with Na₂CO₃, filtered, diluted with hexanes, washed with water, dried, and the solvent removed at reduced pressue. The monomer product as illustrated below was a colorless, odorless fluid with low viscosity as measured in Gardner Viscosity tubes.

10 g of monomer product is mixed with 0.1 wt. % benzoin methyl ether and 0.1 wt % azobis(isobutyronitrile). The initiator-monomer solution is poured into button molds and cured for 20 minutes under UV light in a nitrogen atmosphere and thereafter followed by 30 minutes at 80° C. in air. The buttons are optically clear, colorless, hard and tough. Contact lenses are lathed from these buttons. The following is the formula for the above monomer:

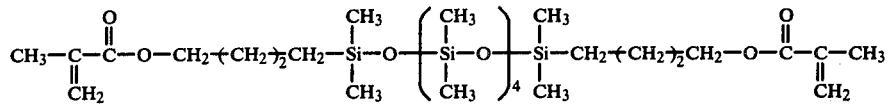

EXAMPLE 11

7 g of the monomer product produced in Example 10 and 3 g of N-vinylpyrrolidone are mixed with 0.1 wt. % benzoin methyl ether and 0.1 wt. % azobis(isobutyronitrile). The initiator-monomer-comonomer solution is cured as described in EXAMPLE 10.

The copolymer buttons obtained are optically clear, colorless, hard and tough. The lathing of the buttons to contact lenses is substantially easier than the lathing of Example 11 buttons.

EXAMPLE 12

30% tetrahydrofurfuryl methacrylate (TFM) is copolymerized with 70% monomer of Example 11 in suitable molds. The buttons obtained are optically clear, colorless, hard and tough. The TFM copolymer buttons are lathe cut into contact lenses.

EXAMPLE 13

99.3 g of octamethyl cyclotetrasiloxane, 0.7 g of 1.3-bis(4-methacryloxybutyl) tetramethyl disiloxane, and 0.3 ml of trifluoromethyl sulphonic acid are charged to a pressure bottle. The bottle is sealed and shaken for five days. The monomer fluid obtained is neutralized with sodium carbonate and diluted with hexanes and filtered. The monomer/hexanes solution is washed with water, dried over MgSO₄ and the solvent removed at reduced pressure. Volatiles are removed from the prepolymer at 0.2 mm Hg pressure and 110° C. High pressure gel permeation chromatography of the product shows all low molecular weight volatile material is removed. The product is a colorless, clear, odorless fluid of very high viscosity with about 800 repeating

units. The following is a formula for the above monomer.

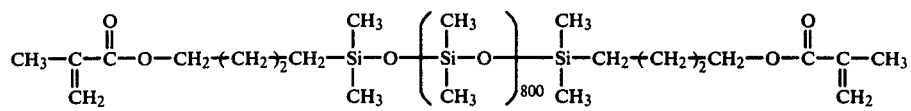

EXAMPLE 14

Films are made from the viscous fluid product of Example 13 using procedures similar to Example 4. The films are tested giving the following results. The following is a representation of the cross linked polymer.

2. The contact lens according to claim 1 wherein the poly(organosiloxane) monomer has the formula:

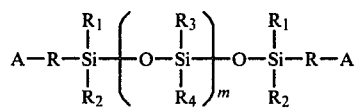

(three dimensional network)

[structural formula of the cross-linked polymer showing two parallel chains with CH$_2$, C=O, O—CH$_2$—(CH$_2$)$_2$CH$_2$—Si(CH$_3$)$_2$—O—[Si(CH$_3$)$_2$—O]$_{800}$—Si(CH$_3$)$_2$—CH$_2$—(CH$_2$)$_2$CH$_2$—O—C(=O)—C(CH$_3$)— groups]

| | |
|---|---|
| Tensile strength | 34 g/mm/mm$^2$ |
| Tensile modulus | 38 g/mm/mm$^2$ |
| % Elongation | 208% |

EXAMPLE 15

Tetramethyl ammonium silanolate is prepared using the method of Gilbert and Kantor (J. Poly. Sci., 40, pp 35–58, (1959), Transient Catalyst for the Polymerization of Organosiloxanes). 13 g of octaphenyl cyclotetrasiloxane, 92.4 g of octamethyl cyclotetrasiloxane, and 2.7 g of 1,3-bis(4-methacryloxybutyl) tetramethyl disiloxane are charged to a 500 ml 4-neck round bottom flask fitted with a drying tube, an N$_2$ gas inlet and a mechanical stirrer. The mixture is heated to 120° C. and ½ ml of the base catalyst added. The temperature is increased to 130° C. over the next 15 minutes and is held there for 10 minutes followed by cooling to room temperature. The viscous fluid product is diluted with hexanes, washed with acidic water (1% HCl), twice with water alone, dried over MgSO$_4$, and solvent removed at reduced pressure. The product is siloxane monomer consisting of 5 mole % phenyl substituted silicone and 95 mole % methyl substituted silicone. An infrared spectrum of the monomer product shows sharp weak absorptions at 700, 1430, 1590 and 3050 cm$^{-1}$ and a shoulder on the broad Si-O-Si absorption at 1125 cm$^{-1}$. These are characteristic of phenyl and silicone phenyl groups. The product is colorless, transparent, odorless, and viscous. The viscosity is 17 stokes as measured in the Gardner Viscosity tubes. It is cast into elastic, transparent films using procedures similar to Example 4.

We claim:

1. A fillerless, hydrolytically stable, biologically inert, transparent, contact lens with the capability of transporting oxygen sufficiently to meet the requirements of the human cornea comprising a poly(organosiloxane) monomer α,ω terminally bonded through divalent hydrocarbon groups to polymerized, free radical polymerizably activated, unsaturated groups forming a polymer in a cross-linked network.

wherein A is an activated unsaturated group, R is a divalent hydrocarbon radical having from 1 to about 22 carbon atoms, R$_1$, R$_2$, R$_3$ and R$_4$ can be the same or different and is selected from the group consisting of a monovalent hydrocarbon radical or a halogen substituted monovalent hydrocarbon radical each having from 1 to 12 carbon atoms and m is 0 or greater.

3. The contact lens according to claim 2 wherein A is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R is an alkylene radical and R$_1$, R$_2$, R$_3$ and R$_4$ is an alkyl radical having from 1 to 10 carbon atoms.

4. The contact lens according to claim 3 wherein m is a number from 0 to about 200.

5. The contact lens according to claim 4 wherein m is a number from 0 to about 50.

6. The contact lens according to claim 5 wherein m is a number from 0 to about 25.

7. The contact lens according to claim 6 wherein the contact lens has a Shore hardness of above 60 on the Shore hardness scale A.

8. The contact lens according to claim 1 wherein the contact lens has a Shore hardness of 60 or below on the Shore hardness scale A.

9. The contact lens according to claim 8 which has a Shore hardness of 25 to 35 on the Shore hardness scale A.

10. The contact lens according to claim 1 which has an oxygen transportability of at least $2 \times 10^{-6}$ cm$^3$/ (sec. cm$^2$ atm).

11. A fillerless, hydrolytically stable, biologically inert, transparent, contact lens with the capability of transporting oxygen sufficiently to meet the requirements of the human cornea comprising a poly(organosiloxane) monomer $\alpha,\omega$ terminally bonded through divalent hydrocarbon groups to polymerized, free radical polymerizably activated, unsaturated groups copolymerized with one or more monomers selected from the group consisting of a lower ester of acrylic and methacrylic acid, styryls, and N-vinyl pyrrolidinone forming a copolymer in a crosslinked network.

12. The contact lens according to claim 11 wherein the monomers are selected from the group consisting of styrene and N-vinyl pyrrolidone.

13. The contact lens according to claim 11 wherein the monomer is selected from the group consisting of allyl methacrylate, butoxyethylmethacrylate, cyclohexyl methacrylate, ethyl methacrylate, methylmethacrylate, ethyl hexyl acrylate, n-butyl acrylate, butyl acrylate and N-vinyl pyrrolidinone.

14. A fillerless, flexible, hydrolytically stable, biologically inert, transparent, resilient, soft, polymeric contact lens with the capability of transporting oxygen sufficiently to meet the requirements of the human cornea comprising a poly(organosiloxane) monomer $\alpha,\omega$ terminally bonded through divalent hydrocarbon groups to polymerized, free radical polymerizably activated, unsaturated groups forming a polymer in a crosslinked network.

15. The contact lens according to claim 14 wherein the contact lens has a Shore hardness of 60 or below on the Shore hardness scale A.

16. The contact lens according to claim 15 which has a Shore hardness of 25 to 35 on the Shore hardness acale A.

17. The contact lens according to claim 14 wherein the contact lens has a tensile modulus of elasticity of about 400 g/mm/mm² or less.

18. The contact lens according to claim 14 wherein the oxygen transportability is at least $2 \times 10^{-6}$ cm³/(sec. cm² atm).

19. The contact lens according to claim 14 wherein the lens is made by spin casting.

20. The contact lens according to claim 14 wherein the poly(organosiloxane) monomer has the formula:

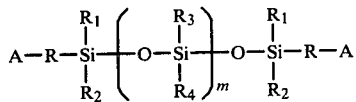

wherein A is an activated unsaturated group, R is a divalent hydrocarbon radical having from 1 to about 22 carbon atoms, $R_1$, $R_2$, $R_3$ and $R_4$ can be the same or different and is selected from the group consisting of a monovalent hydrocarbon radical or a halogen substituted monovalent hydrocarbon radical each having from 1 to 12 carbon atoms and m is 50 or greater.

21. The contact lens according to claim 20 wherein m is a number of from about 50 to about 800.

22. The contact lens according to claim 21 wherein A is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R is an alkylene radical and $R_1$, $R_2$, $R_3$ and $R_4$ is an alkyl radical having from 1 to 10 carbon atoms.

23. The contact lens according to claim 22 wherein the alkylene radical has from about 1 to about 4 carbon atoms.

24. The contact lens according to claim 23 wherein the alkylene radical has from about 3 to about 4 carbon atoms.

25. The contact lens according to claim 24 wherein $R_1$, $R_2$, $R_3$ and $R_4$ are selected from the group consisting of a methyl radical and a phenyl radical.

26. The contact lens according to claim 25 wherein $R_1$, $R_2$, $R_3$ and $R_4$ are methyl radicals.

27. A fillerless, flexible, hydrolytically stable, biologically inert, transparent, resilient, soft, polymeric contact lens with the capability of transporting oxygen sufficiently to meet the requirements of the human cornea comprising a poly(organosiloxane)monomer $\alpha,\omega$ terminally bonded through divalent hydrocarbon groups to polymerized, free radical polymerizably activated, unsaturated groups copolymerized with one or more monomers selected from the group consisting of a lower ester of acrylic and methacrylic acid, styryls, and N-vinyl pyrrolidone forming a copolymer in a crosslinked network.

28. The contact lens according to claim 27 wherein the monomers are selected from the group consisting of styrene and N-vinyl pyrrolidone.

29. The contact lens according to claim 27 wherein the monomer is selected from the group consisting of allyl methacrylate, butoxyethylmethacrylate, cyclohexyl methacrylate, ethyl methacrylate, methylmethacrylate, ethyl hexyl acrylate, n-butyl acrylate, butyl acrylate and N-vinyl pyrrolidone.

* * * * *

UNITED STATES PATENT AND TRADEMARK OFFICE
CERTIFICATE OF CORRECTION

PATENT NO. : 4,153,641
DATED : May 8, 1979
INVENTOR(S) : William G. Deichert et al It is certified that error appears in the above-identified patent and that said Letters Patent are hereby corrected as shown below:

Col. 3, line 6, delete "lines 55-46" and substitute therefor --lines 35-46--;

Col. 5, line 44, delete "produce" and substitute therefor --product--;

Col. 6, line 11, after "50" insert --to--;
line 46, after "pyrrolidinone-" delete "X" and substitute therefor --x--;

Col. 8, second line of last formula, after "0" delete "SI" and substitute therefor --Si--;

Col. 15, line 16, delete "174 hr." and substitute therefor --1/4 hr.--;

Col. 16, line 14, after "(4-" delete "mehacryloxbutyl" and substitute therefor --methacryloxbutyl--;

Col. 17, line 46, after "80° C." delete "over" and substitute therefor --oven--; and Col. 23, line 31, after "hardness" (second occurrence) delete "acale" and substitute therefor --scale--.

Signed and Sealed this

Twenty-ninth Day of July 1980

[SEAL]

Attest:

SIDNEY A. DIAMOND

Attesting Officer

Commissioner of Patents and Trademarks